United States Patent
Ansari et al.

(10) Patent No.: US 6,473,897 B1
(45) Date of Patent: Oct. 29, 2002

(54) METHOD AND APPARATUS FOR GENERATING MULTIPLE PROCESSOR-SPECIFIC CODE SEGMENTS IN A SINGLE EXECUTABLE

(75) Inventors: Zia Ansari; Kevin B. Smith, both of Hillsboro, OR (US); Seth Abraham, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,714

(22) Filed: Dec. 29, 1999

Related U.S. Application Data

(63) Continuation-in-part of application No. 09/059,601, filed on Apr. 13, 1998, now Pat. No. 6,049,668.

(51) Int. Cl.[7] ................................................ G06F 9/45
(52) U.S. Cl. ........................ 717/136; 717/140; 717/152
(58) Field of Search ................................. 717/136, 140, 717/152; 709/330–332; 714/34

(56) References Cited

U.S. PATENT DOCUMENTS

| | | | | |
|---|---|---|---|---|
| 4,849,879 A | * | 7/1989 | Chinnaswamy et al. | 706/45 |
| 5,604,905 A | | 2/1997 | Tevanian et al. | 717/140 |
| 5,659,751 A | | 8/1997 | Heninger | 709/305 |
| 5,696,974 A | | 12/1997 | Agrawal et al. | 717/152 |
| 5,774,726 A | | 6/1998 | Ahmed | 717/136 |
| 5,784,636 A | * | 7/1998 | Rupp | 712/37 |
| 5,835,699 A | | 11/1998 | Kimura | 714/34 |
| 5,835,773 A | | 11/1998 | Dunn | 717/136 |
| 5,835,775 A | * | 11/1998 | Washington et al. | 717/153 |
| 5,842,014 A | * | 11/1998 | Brooks et al. | 709/103 |
| 6,049,668 A | * | 4/2000 | Smith et al. | 717/136 |
| 6,128,720 A | * | 10/2000 | Pechanek et al. | 712/20 |
| 6,144,989 A | * | 11/2000 | Hodjat et al. | 709/202 |
| 6,298,475 B1 | * | 10/2001 | Alcorn | 717/131 |

\* cited by examiner

*Primary Examiner*—Gregory Morse
*Assistant Examiner*—John Q. Chavis
(74) *Attorney, Agent, or Firm*—Schwegman, Lundberg, Woessner & Kluth, P.A.

(57) ABSTRACT

A computer-implemented method analyzes a source code segment which is to be compiled for execution by any one of several different processor types. The method determines whether a performance advantage would be achieved by generating a customized version of object code that can be executed by one of the processor types compared with generating a non-customized version. If a performance advantage would be achieved, the method generates at least one customized object code version and a non-customized version for the source code segment, and it generates a control section that causes one of the object code versions to be called during execution of the object code in accordance with an executing processor's processor type. If no performance advantage would be achieved, the method generates a non-customized version of the object code that can be executed by any of the different processor types.

41 Claims, 11 Drawing Sheets

```
201~ cpu_specific (pentium_iii)
     print_cpu (void)
205~   printf ("Pentium® III processor\n");

211~ cpu_specific (pentium_ii)
     print_cpu (void)
215~   printf ("Pentium® II processor\n");

221~ cpu_specific (pentium_pro)
     print_cpu (void)
225~   printf ("Pentium® Pro processor\n");

241~ cpu_specific (pentium_mmx)
     print_cpu (void)
245~   printf ("Pentium® processor with MMX™ technology\n");

261~ cpu_specific (pentium)
     print_cpu (void)
265~   printf ("Pentium® processor\n");

281~ cpu_dispatch (pentium_ii, pentium_pro, pentium_mmx, pentium)
     print_cpu (void)
287~
```

FIG. 2

```
      $B5$1:
402~ test   DWORD PTR_intel_cpu_indicator, -32
404~ jne    _print_cpu$F
     test   DWORD PTR_intel_cpu_indicator, -16
     jne    _print_cpu$E
     test   DWORD PTR_intel_cpu_indicator, -8
     jne    _print_cpu$D
     test   DWORD PTR_intel_cpu_indicator, -12
     jne    _print_cpu$C
     test   DWORD PTR_intel_cpu_indicator, -2
     jne    _print_cpu$B
412~ test   DWORD PTR_intel_cpu_indicator, -1
414~ jne    _intel_cpu_dispatch_fail
416~ call   _intel_cpu_indicator_init
418~ jmp    $B5$1
```

FIG. 4

900 ~ File_A
　　910 ~ Function_A_1
　　　　·
　　915 ~ Function_FOO
　　　　·
　　920 ~ Function_A_M
930 ~ File_B
　　Function_B_1
　　　·
　　　·
　　　·
　　Function_B_P
940 ~ File_C
　·
　·
　·
950 ~ File_N
　　Function_N_1
　　　·
　　　·
　　　·
　　Function_N_Q

FIG. 9

```
1000~Function_FOOtest    DWORD PTR_intel_cpu_indicator, -32
1005~jne                 Function_FOO_$F
1010~test                DWORD PTR_intel_cpu_indicator, -16
1015~jne                 Function_FOO_$E
1020~test                DWORD PTR_intel_cpu_indicator, -1
1025~jne                 Function_FOO_$B
1030~call                _intel_cpu_indicator_init
1035~jmp                 Function_FOO
```

FIG. 10

1100~Function_FOO_$F   Function_FOO
             1105~ABCDEFG
             1110~abababab

FIG. 11

1200~Function_FOO_$E   Function_FOO
             1205~JKLMN
             1210~xyxyxy

FIG. 12

1300~Function_FOO_$B   Function_FOO
             1305~jkjkjkjk
             1310~pqpqpq

FIG. 13

METHOD AND APPARATUS FOR GENERATING MULTIPLE PROCESSOR-SPECIFIC CODE SEGMENTS IN A SINGLE EXECUTABLE

RELATED APPLICATION

This application is a continuation-in-part of U.S. patent application Ser. No. 09/059,601, filed on Apr. 13, 1998 now U.S. Pat. No 6,049,668.

BACKGROUND OF THE INVENTION

1. Field of the Invention

The present invention pertains to compilers and software programming. More particularly, this invention relates to generating multiple processor-specific code segments in a single executable.

2. Background of the Invention

Modem computer systems can have any of a wide range and variety of configurations. One important component of a computer system is the processor, also referred to as the central processing unit (CPU). The processor executes instructions from a software program, a process referred to as "running" the program. Although typically all processors perform this basic task, a wide variety of different processors are available from a number of different manufacturers. These different processors, especially those from different manufacturers, have different internal designs, also referred to as the processor "architecture", and thus operate in different ways. Although the results from running a program on two different processors are typically the same, the way in which the processor obtains the result, as well as its speed, typically differ.

Many conventional processors, such as the Pentium® Pro processor and Pentium® processor with MMX™ technology (both available from Intel Corporation of Santa Clara, Calif.) are based on an architecture referred to as "x86". Software programs can be written which are executable by any x86-compatible processor. However, various changes can also be made to a software program in order to allow it to be executed faster by a particular processor type. By way of example, a Pentium® processor with MMX™ technology is capable of executing additional instructions, i.e., those associated with the MMX™ technology, which a Pentium® Pro processor is not capable of executing. Given the advantages of using such instructions, it would be beneficial to provide a way for a programmer to include code customized to both the Pentium® processor with MMX™ technology and the Pentium® Pro processor in the same program.

However, a software programmer also typically wants his or her code to be executable by as many processors as possible, thereby allowing a greater share of the market to purchase his or her product. This desire, then, is balanced against the programmer's desire to write code that works efficiently and makes the best use of the processor which is executing it. One way to do so is to write a separate program for each possible processor which might execute the program. However, such a solution is problemsome in that it is time-intensive and costly, often resulting in a large amount of unnecessary duplication.

Another solution is to write a single program which includes different routines or functions designed to take advantage of the various capabilities of the processors which may run the program. However, one problem with this solution is that most programming languages do not allow multiple functions to have the same function name. Thus, the programmer must give the different functions for the different processors different names and correctly manage these different names throughout the rest of the program. This can be particularly difficult due to the requirement that all portions of the code must correctly identify the different functions by their different names. Thus, a need exists for an improved way to customize programs for specific processors.

SUMMARY OF THE INVENTION

In one embodiment, a method is disclosed which includes a compiler analyzing a source code segment. The compiler determines whether generating a customized version of object code for the source code segment to execute on one of several types of processors would provide a performance advantage over generating a non-customized version of object code. If so, the compiler generates the customized version of object code; otherwise, the compiler generates the non-customized version of object code.

In another embodiment, a processor executes a compiler program that includes the operations of the compiler program analyzing a source code segment, and the compiler program determining whether generating a customized version of object code for the source code segment to execute on one of several types of processors would provide a performance advantage over generating a non-customized version of object code. If so, the compiler program generates the customized version of object code; otherwise, the compiler program generates the non-customized version of object code.

In yet another embodiment, a computer-readable medium contains computer instructions for instructing a processor, the instructions including analyzing a source code segment, and determining whether generating a customized version of object code for the source code segment to execute on one of several types of processors would provide a performance advantage over generating a non-customized version of object code. If so, the customized version of object code is generated; otherwise, the non-customized version of object code is generated.

Other embodiments are disclosed and claimed.

BRIEF DESCRIPTION OF THE DRAWINGS

The present invention is illustrated by way of example and not limitation in the figures of the accompanying drawings in which like references indicate similar elements and in which:

FIG. 2 illustrates multiple code segments incorporating the processor-specific and dispatch constructs according to one embodiment of the present invention;

FIG. 4 illustrates sample assembly code generated according to one embodiment of the present invention;

FIG. 9 illustrates sample source code segments that can be compiled by an automatic CPU dispatch construct according to an alternate embodiment of the invention;

FIG. 10 illustrates sample assembly code for CPU-dispatch testing that is generated using automatic CPU dispatch according to an alternate embodiment of the invention;

FIG. 11 illustrates sample assembly code optimized for a high performance CPU that is generated using automatic CPU dispatch according to an alternate embodiment of the invention;

FIG. 12 illustrates sample assembly code optimized for a medium performance CPU that is generated using automatic CPU dispatch according to an alternate embodiment of the invention; and FIG. 13 illustrates sample assembly code with no CPU-specific optimizations that is generated using automatic CPU dispatch according to an alternate embodiment of the invention.

DETAILED DESCRIPTION

Figure 1:
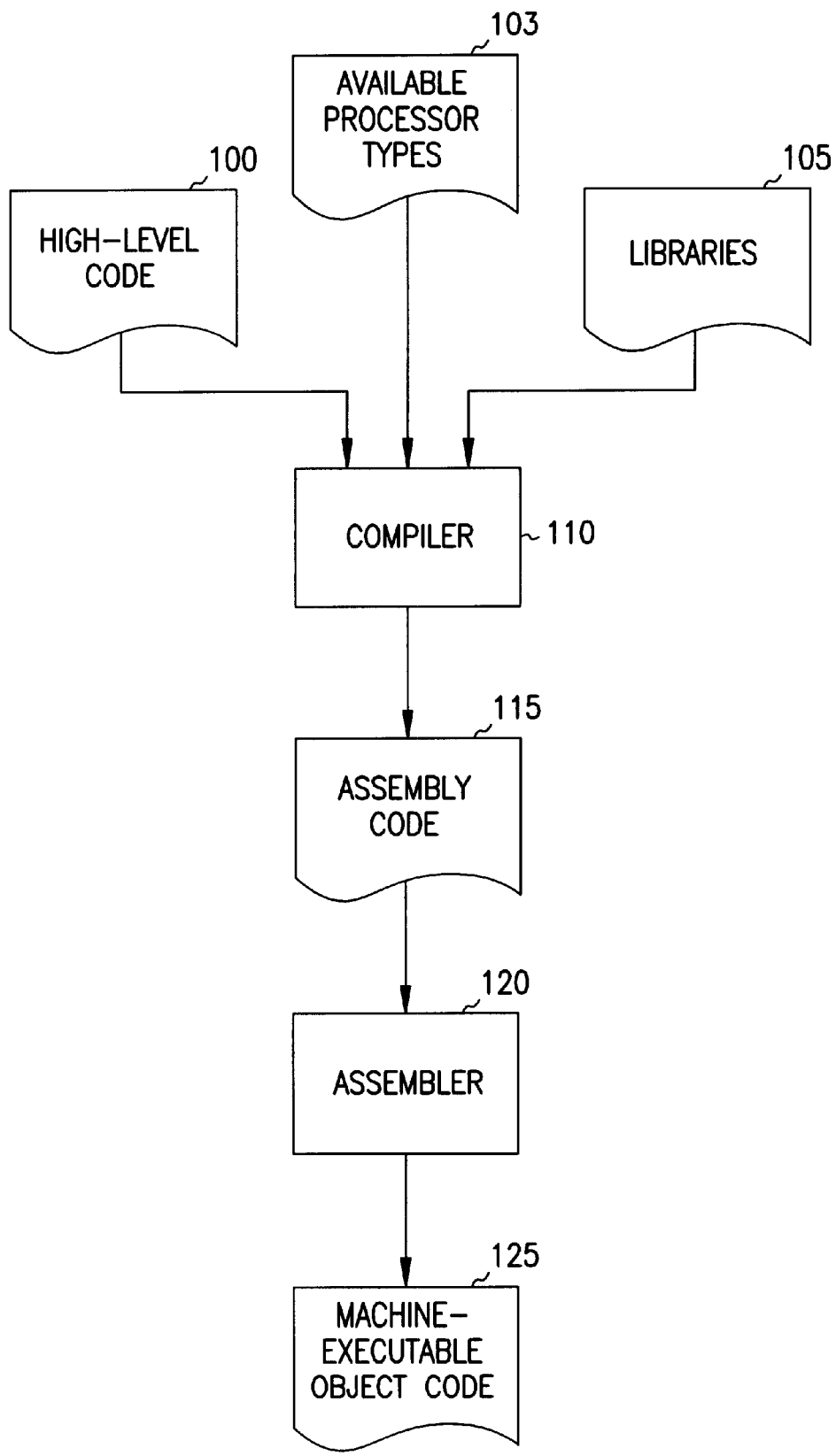
FIG. 1 illustrates the generation of machine executable code according to one embodiment of the present invention.

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading, to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Modern programmers typically write programs in what are referred to as "high-level" programming languages. Examples of such high-level programming languages include C, C++, PASCAL, and Fortran. High-level programming languages make it easier for the programmer to write his or her code, however, they also must be converted into a form which can be interpreted by a processor in order for it to run the program. The form of a program which can be interpreted by a processor is typically referred to, and will be referred to herein, as "object code". (This should not be confused with an object file which contains object code.)

In one embodiment, the present invention allows a programmer to create multiple code segments with the same identifier but different processor-specific instructions. These code segments are typically a "function" or "procedure" of the high-level programming language in the illustrated embodiment, but can be larger or smaller blocks of code. As used herein, "code segment" refers to one or more software instructions or statements. The code segment identifiers are typically the function or procedure name, but different identifiers can be used in alternate embodiments.

Thus a programmer is able to customize different code segments, all with the same identifier, for different processor types. The object code corresponding to a particular one of these different code segments is then executed when the program runs, with the particular one of the different code segments being based on the type of processor which is running the program. Each of the several types of processors can be a different processor architecture.

In another embodiment, the present invention comprises a computer-implemented method that analyzes a source code segment which is to be compiled for execution by any one of several different processor types. The method determines whether a performance advantage would be achieved by generating a customized version of object code that can be executed by one of the processor types compared with generating a non-customized version. If a performance advantage would be achieved, the method generates at least one customized object code version and a non-customized version for the source code segment, and it generates a control section that causes one of the one or more object code versions to be called during execution of the object code in accordance with an executing processor's processor type. If no performance advantage would be achieved, the method generates a non-customized version of the object code that can be executed by any of the different processor types. Again, each of the several types of processors can be a different processor architecture.

FIG. 1 illustrates the generation of machine executable code according to one embodiment of the present invention. High-level code 100 is coded or code generated from an application generator in a high-level programming language and is input to a compiler 110. Additional functions and procedures from libraries 105 may also be used by compiler 110 in compiling high-level code 100. Such additional functions are typically identified within the high-level code 100 and are typically general-purpose routines (for example, input/output (I/O) routines) which many programs will use. It is to be appreciated that although the present invention is discussed with reference to the high-level code 100, it may also be used with the code in the libraries 105.

Compiler 110 is informed of the available processor types that will execute machine-executable object code compiled by compiler 110, for example by a list or table 103 of available processor types such as Table I discussed below.

Compiler 110 generates assembly code 115 from high-level code 100 and possibly libraries 105. Assembly code 115 provides a more human-readable version of the architectural- or processor-dependent object code, discussed below, and is also referred to as "assembly language". Assembly code 115 can be thought of as a mid-level programming language in relation to the high-level languages discussed above. The assembly code 115 can optionally be saved by compiler 110 as a separate file during the compilation process. Some compilers 110 make at least two or three "passes" through the high-level code 100 when creating the assembly code 115. Various customizations may also be made by compiler 110 in generating the assembly code 115 during these passes. The customizations are compiler-specific and conventionally have been identified by the programmer.

For example, in one embodiment of the invention, the compiler 110, in one pass, analyzes the high-level code 100 function-by-function to determine which functions, if any, represent an opportunity to take advantage of CPU-specific instructions. Examples of such CPU-specific instructions are instructions from a particular CPU's instruction set that can execute the function faster and/or more efficiently or provide data in a unique format for further processing.

For example, a high performance CPU such as a Pentium® III processor can execute vectorizable loops using single-precision floating-point single-instruction-multiple-data (SIMD) instructions, whereas a Pentium® processor cannot do so. As another example, integer floating-point SIMD instructions can be processed by a Pentium® III processor, a Pentium® II processor, or a Pentium® processor with MMX™ technology, but not by a Pentium® Pro processor, a Pentium® processor, or an Intel® 486 processor.

In yet another example, a Pentium® II processor or a Pentium® processor with MMX™ technology is capable of executing instructions associated with MMX™ technology, which a Pentium® Pro processor is not capable of executing. One of ordinary skill in the programming arts will understand how to write compiler code that implements the analytical features of the present invention.

Thus, in a first pass, the compiler 110 identifies those functions that can be optimized. Depending upon the number of CPU types that will potentially be used to execute the object code, compiler 110 can identify a number N of possible optimizations for any given function up to and including the number N of CPU types.

In a subsequent pass, compiler 110 compiles the high-level code 100 into assembly code, compiling up to N separate versions, depending upon the number of opportunities for optimization. For example, if N=6, i.e. there are potentially six different types of CPU's that will be used to execute the object code, there could potentially be five different customized versions of assembly code, one for each of the CPU's that have a higher performance level than the base CPU, plus one non-customized version for the lowest performance CPU.

If compiler 110 determines, regarding a particular function, that customization of assembly code would not provide a sufficient performance advantage, then it compiles a non-customized version of that particular function so that it is capable of being executed by any of the N CPU types.

It will be apparent that some compilers convert high-level code directly to object code without first converting it to assembly language, and the present invention is intended to cover all types of compilers.

Assembly code 115 is input to an assembler 120. Assembler 120 converts the assembly code 115 into machine-executable object code 125. Object code 125 is a stream of binary values which can be executed by a processor. Object code 125 is also referred to as an "executable".

Except for the incorporation of the teachings of the present invention, compiler 110 and assembler 120 are intended to represent a wide range of compilers and assemblers well-known to those skilled in the art.

In the illustrated embodiment, compiler 110 and assembler 120 are implemented in software.

In one of the illustrated embodiments, two "constructs" are added to the high-level programming language in order to provide support for multiple code segments with the same identifier. These constructs can be incorporated into the programming language in any of a wide variety of conventional manners, including making the constructs "extensions" to a pre-existing language as discussed in more detail below. The first construct is a "processor-specific" construct which identifies a function as being specific to a particular processor type. The syntax of this processor-specific construct is:

$cpu_{13}$ specific (cpu_specifier) function_definition where the "function definition" is the particular function being written by the programmer and the "cpu_specifier" is an identifier of a particular processor type for that particular function. The processor type refers to a particular processor architecture. Examples of processor types that can be supported by one implementation of the present invention are listed below in Table I. Although specific examples are listed in Table I, it should be noted that additional processor types and cpu_specifiers can be used with the present invention, including future processor types.

TABLE I

| cpu_specifier | Processor Type |
|---|---|
| pentium_iii | Pentium ® III processor |
| pentium_ii | Pentium ® II processor |
| pentium_pro | Pentium ® Pro processor |
| pentium_mmx | Pentium ® processor with MMX ™ technology |
| pentium | Pentium ® processor |
| generic | A "generic" processor, other than one of the Pentium ® processor family or Pentium ® Pro processor family |

The second construct is a "dispatch" construct which is used during compilation to identify the processor-specific constructs and the different processor types to which they correspond. The syntax of this dispatch construct is:

cpu_dispatch (cpu_specifier [, cpu_specifier [ . . . ]])
     empty_function_definition The "empty_function_definition" is an empty function (no code) having the same name as the function_definition. Multiple cpu_specifier identifiers may be included in the cpu_dispatch construct, one for each cpu_specific construct for the function_definition.

According to one embodiment of the present invention, the cpu_specific and cpu_dispatch constructs are implemented as an "extension" to the C and C++ programming languages. Although these extension constructs are not part of the original programming language, they can be added to the language and used as if they were a part of the original language, such as by using the Microsoft™ "__declspec" keyword. The "__declspec" keyword can be used to identify a function as an extension to the language. According implementation, the syntax for doing so is as follows:

__declspec (cpu_specific (cpu_specifier))function definition
   __declspec (cpu_dispatch (cpu_specifier [, cpu_specifier [ . . . ]]) empty_function_definition The cpu_specifier, function_definition, and empty_function_definition are the same as discussed above.

FIG. 2 illustrates multiple code segments written in the C++ programming language incorporating the cpu_specific and cpu_dispatch constructs. As illustrated, software program 200 includes a first cpu_specific construct 201 which identifies a print_cpu function 205 customized to the Pentium® III processor (as indicated by cpu_specifier identifier 208). Similarly, program 200 also includes a second cpu_specific construct 211 which identifies a print_cpu function 215 customized to a Pentium® II processor, a third CPU-specific construct 221 which identifies a print_cpu function 225 customized to the Pentium® Pro processor, a fourth cpu_specific construct 241 which identifies a print_cpu function 245 customized to the Pentium® processor with MMX™ technology, and a fifth print_cpu construct 261 which identifies a print_cpu function 265 customized to the Pentium® processor. As illustrated, each of the five print_cpu functions has the same function name but different instructions which are customized to particular processor types.

Software program 200 also includes a cpu_dispatch construct 281. The cpu_dispatch construct 281 includes a list of identifiers which includes each of the processor types listed in the cpu_specific constructs 201, 211, 221, 241, and 261. The cpu_dispatch construct 281 identifies a print_cpu function 287, the name of which is the same as the function in the cpu_specific constructs 201, 211, 221, 211, and 261 The cpu_specific constructs and the cpu_dispatch constructs allow the present invention to be used multiple times within the same program on different function names. Thus, other processor-specific functions (not shown) can be included along with constructs 201, 211, 221, 241, 261, and 281 in program 200.

It should be noted that the cpu_specific functions 201, 211, 221, 241, and 261 of FIG. 2 may be located adjacent one another as illustrated in program 200, or alternatively may be distributed throughout different locations of program 200.

Figure 3:
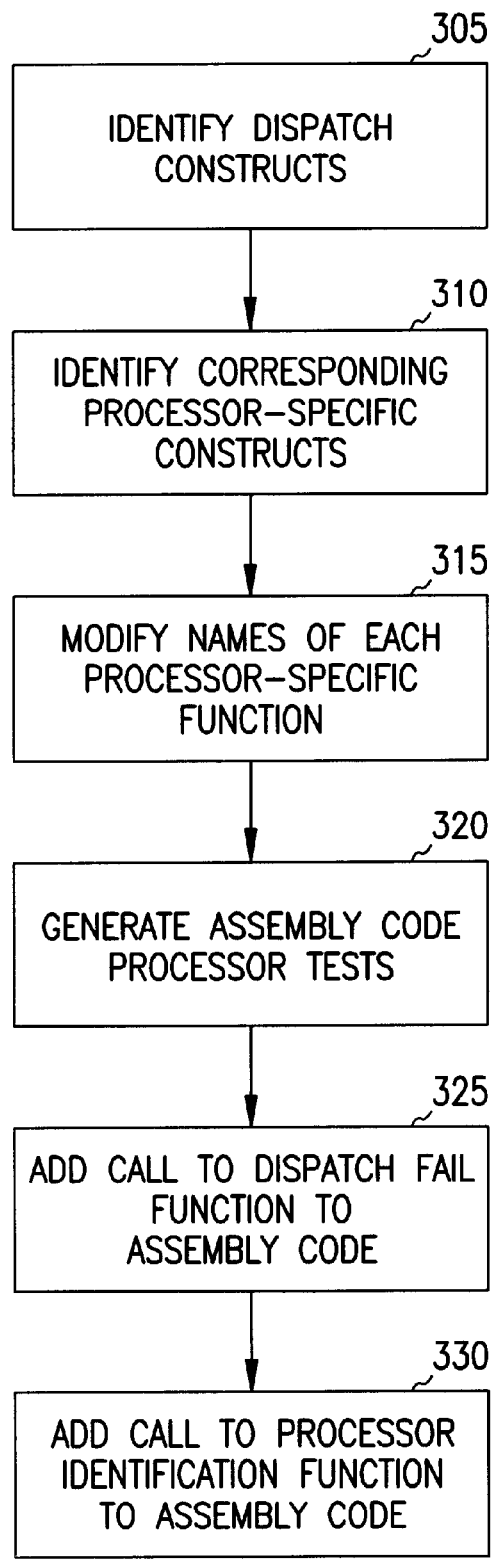
FIG. 3 is a flowchart illustrating the steps followed in compiling high-level language according to one embodiment of the present invention.

FIG. 3 is a flowchart illustrating the steps followed in compiling the high-level language according to one embodiment of the present invention. During compilation, a dispatch construct is first identified, step 305. In the illustrated embodiment, this is the cpu_dispatch construct 281 of FIG. 2. Processor-specific constructs corresponding to the dispatch construct are then identified, step 310. In the illustrated embodiment, the empty_function_definition of the cpu_dispatch construct is the same name as the function_definition of the cpu_specific construct. Thus, the compiler is able to search through the high-level program to identify each of the different processor-specific constructs which correspond to the dispatch construct, which are constructs 201, 211, 221, 241, and 261 of FIG. 2.

The compiler then modifies the names of each of the processor-specific functions, step 315. This is done in order for the assembler to distinguish between each of the different functions. However, this step is done by the compiler and is not visible to the high-level language programmer, who views each of the functions as having the same name. In one embodiment, this is accomplished by a "name mangling" algorithm, which modifies function names as necessary during compilation. In this embodiment, the compiler is pre-programmed with possible processor types and an appropriate modification for each function name based on processor type. By way of example, the characters "$B" can be added to the end of a function name for a Pentium® processor type, while the characters "$F" can be added to the end of a function name for a Pentium® III processor type. In the illustrated embodiment, at least one character which is an invalid character for a function name in the high-level language is added to the function name in the object code. This use of an invalid high-level language character in the object code ensures that the compiler does not modify the name to be the same as another function name created by the programmer.

The compiler then generates multiple assembly code processor tests corresponding to the dispatch construct, step 390. These multiple tests access an intel_cpu_indicator variable to identify the processor type. According to one embodiment of the present invention, the intel_cpu_indicator is a bit vector which encodes the processor type. The bit vectors and their corresponding processor types according to one embodiment of the present invention are illustrated in Table II below. Alternate embodiments can include a lesser or greater number of bits.

TABLE II

| Bit Vector | Processor Type |
| --- | --- |
| 00000000000000000000000000000001 | generic |
| 00000000000000000000000000000010 | Pentium ® processor |
| 00000000000000000000000000000100 | Pentium ® Pro processor |
| 00000000000000000000000000001000 | Pentium ® processor with MMX ™ technology |
| 00000000000000000000000000010000 | Pentium ® II processor |
| 00000000000000000000000000100000 | Pentium ® III processor |

The compiler then adds a "call to dispatch fail function" instruction to the assembly code, step 325. This dispatch fail instruction identifies a course of action to take when the processor type is not identifiable. In the illustrated embodiment, the dispatch fail instruction is a jump instruction to a dispatch fail function which is a library function that is programmer-replaceable. Thus, the programmer is able to display, for example, an error message indicating the program cannot be executed by the current processor, or alternatively provide a "bare minimum" amount of code which will allow the program to continue running.

The compiler then adds a "call to processor identification function" instruction to the assembly code, step 330. The processor identification instruction identifies a course of action to take when the processor type has not yet been identified. In the illustrated embodiment, the processor identification instruction is a call to a cpu_indicator initialization function which loads the processor type information into the intel_cpu_indicator variable. Thus, once the processor type is loaded into the intel_cpu_indicator variable, the code will be able to access and identify the processor type.

The cpu_indicator initialization function obtains the processor type information using the CPUID instruction, supported by many Intel processors. The CPUID instruction identifies the processor family (e.g., Pentium® processor family or Pentium® Pro processor family), as well as whether the processor is enabled with MMX™ technology (e.g., the Pentium® processor with MMX™ technology, the Pentium® II processor, or Pentium® III processor), thereby indicating whether the processor type is a Pentium® processor, Pentium® II processor, Pentium® III processor, Pentium® Pro processor, or Pentium® processor with MMX™ technology. Additional information may also be returned by the CPUID instruction, such as the stepping of the processor. This additional information can be used in alternate embodiments of the present invention to distinguish between different processor types. By way of example, a particular stepping of a processor may have a "bug" which is not present in subsequent steppings, and thus different code segments can be written customized to the different steppings.

During initialization of the program, the intel_cpu_indicator variable is initialized to zero. The processor type is then stored in the intel_cpu_indicator variable when the cpu_indicator initialization function is called. Thus, in the illustrated embodiment the cpu_indicator initialization function need not be called more than once during program execution.

FIG. 4 illustrates sample assembly code generated according to one embodiment of the present invention by a compiler from the program code 200 of FIG. 2. The assembly code provides a series of tests for processor types. The tests are performed during execution by checking a value stored at the memory location identified by intel_cpu_indicator (i.e., the intel_cpu_indicator variable). If the test succeeds, then the code jumps to the appropriate address for the beginning of the function for the identified processor type. However, if a test fails, then the code checks for another processor type.

As illustrated, the code initially checks with test 402 whether the processor type is a Pentium®III processor. If the processor type is a Pentium® III processor, then the jump instruction 404 transfers program execution to the memory location indicated by _print_cpu$F, which is the memory address of the section of code for the _print_cpu function customized to the Pentium® III processor (function 205 of FIG. 2). The assembly code contains similar tests for the Pentium® II processor, Pentium® Pro processor, Pentium® processor with MMX™ technology, and the Pentium® processor.

The final test 412 checks whether there is a non-zero value stored in the intel_cpu_indicator variable. If there is a non-zero value, then jump instruction 414 jumps program execution to a dispatch fail function located at the address intel_cpu_dispatch_fail. However, if there is not a non-zero value stored in the intel_cpu_indicator variable, then a call 416 to the cpu_indicator initialization function located at the address intel_cpu_indicator is made. Upon return from the cpu_indicator initialization function, the program execution continues in a jump to test instruction 402, thereby repeating the process. However, now that the intel_cpu_indicator variable has been initialized, one of the tests for processor type will be successful, indicating either a particular processor type or a dispatch fail.

In the illustrated embodiment, the compiler orders the test instructions so that the program execution jumps to the most "advanced" function (that is, the function customized to the most advanced processor architecture) which can be executed by the processor executing the program. By way of example, if two customized functions are generated, one for a Pentium® processor and one for a Pentium® processor with MMX™ technology, and if the process processor executing the program is a Pentium® II processor, then the test for the Pentium® processor with MMX™ technology is successful, thereby causing program execution to jump to the function customized for the Pentium® processor with MMX™ technology.

Also in the illustrated embodiment, the compiler orders the test instructions in the assembly code such that the highest performance processor is tested for first. This reduces the overhead (the additional tests) of the present invention for higher performance processors. However, alternate embodiments can use different orderings. In one such alternate embodiment, the test instructions are ordered so that the most likely processor to be executing the program is tested for first.

The assembly code illustrated in FIG. 4 is a sample of assembly code which is generated according to one embodiment of the present invention. Alternate embodiments can generate different assembly code. By way of example, the ordering of the test instructions can be changed, the test values (−32, −16, −8, −12, and −2) can be changed, different types of testing or comparing instructions can be used, etc.

For ease of explanation, the present invention has been described in terms of the assembly code generated by the compiler. Those skilled in the art will appreciate that this assembly code is subsequently converted to object code which is executed by the processor.

Figure 5:
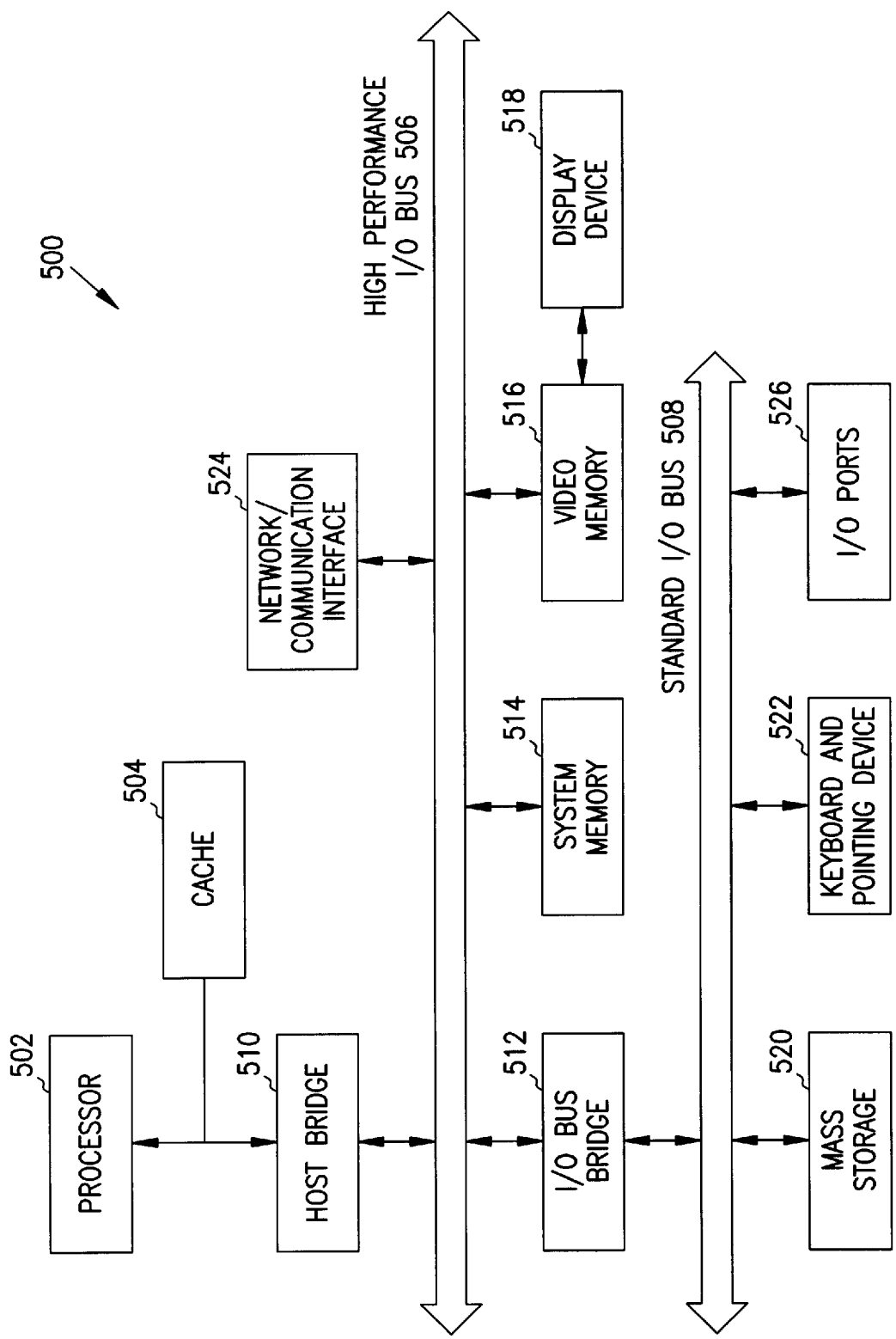
FIG. 5 illustrates an example hardware system suitable for use with one embodiment of the present invention.

FIG. 5 illustrates an example hardware system suitable for use with one embodiment of the present invention. Hardware system 500 includes processor 502 and cache memory 504 coupled to each other as shown. Additionally, hardware system 500 includes high performance input/output (I/O) bus 506 and standard I/O bus 508. Host bridge 510 couples processor 502 to high performance I/O bus 506, whereas I/O bus bridge 512 couples the two buses 506 and 508 to each other. Coupled to bus 506 are network network/communication interface 524, system memory 514, and video memory 516. In turn, display device 518 is coupled to video memory 516. Coupled to bus 508 are mass storage 520, keyboard and pointing device 522, and I/O ports 526. Collectively, these elements are intended to represent a broad category of hardware systems, including but not limited to general purpose computer systems based on the Pentium® processor, Pentium® Pro processor, Pentium® II processor, Pentium® III processor, or Pentium® processor with MMX™ technology, available from Intel Corporation of Santa Clara, Calif.

These elements 502–524 perform their conventional functions known in the art. In particular, network/communication interface 524 is used to provide communication between system 500 and any of a wide range of conventional networks, such as an Ethernet, token ring, the Internet, etc. It is to be appreciated that the circuitry of interface 524 is dependent on the type of network the system 500 is being coupled to.

Mass storage 520 is used to provide permanent storage for the data and programming instructions to implement the above described functions, whereas system memory 514 is used to provide temporary storage for the data and programming instructions when executed by processor 502. I/O ports 526 are one or more serial and/or parallel communication ports used to provide communication between additional peripheral devices which may be coupled to hardware system 500.

It is to be appreciated that various components of hardware system 500 may be rearranged. For example, cache 504 may be on-chip with processor 502. Alternatively, cache 504 and processor 502 may be packed together as a "processor module", with processor 502 being referred to as the "processor core". Furthermore, certain implementations of the present invention may not require nor include all of the above components. For example, mass storage 520, keyboard and pointing device 522, and/or display device 518 and video memory 516 may not be included in system 500. Additionally, the peripheral devices shown to standard I/O bus 508 may be coupled to high performance I/O bus 506; in addition, in some implementations only a single bus may exist with the components of hardware system 500 being coupled to the single bus. Furthermore, additional components may be included in system 500, such as additional processors, storage devices, or memories.

In one embodiment, the compiling and assembling of instructions according to the present invention is implemented as a series of software routines run by hardware system 500 of FIG. 5. In this embodiment, compiler 110 and assembler 120 of FIG. 1 are each implemented as a series of software routines. These software routines comprise a plurality or series of instructions to be executed by a processor in a hardware system, such as processor 502 of FIG. 5. Initially, the series of instructions are stored on a storage device, such as mass storage 520. It is to be appreciated that the series of instructions can be stored using any conventional storage medium, such as a diskette, CD-ROM, magnetic tape, DVD, laser disk, ROM, Flash memory, etc. It is also to be appreciated that the series of instructions need not be stored locally, and could be received from a remote storage device, such as a server on a network, via network/ communication interface 524. The instructions are copied from the storage device, such as mass storage 520, into memory 514 and then accessed and executed by processor 502. In one implementation, these software routines are written in the C++ programming language. It is to be appreciated, however, that these routines may be implemented in any of a wide variety of programming languages.

Figure 6:
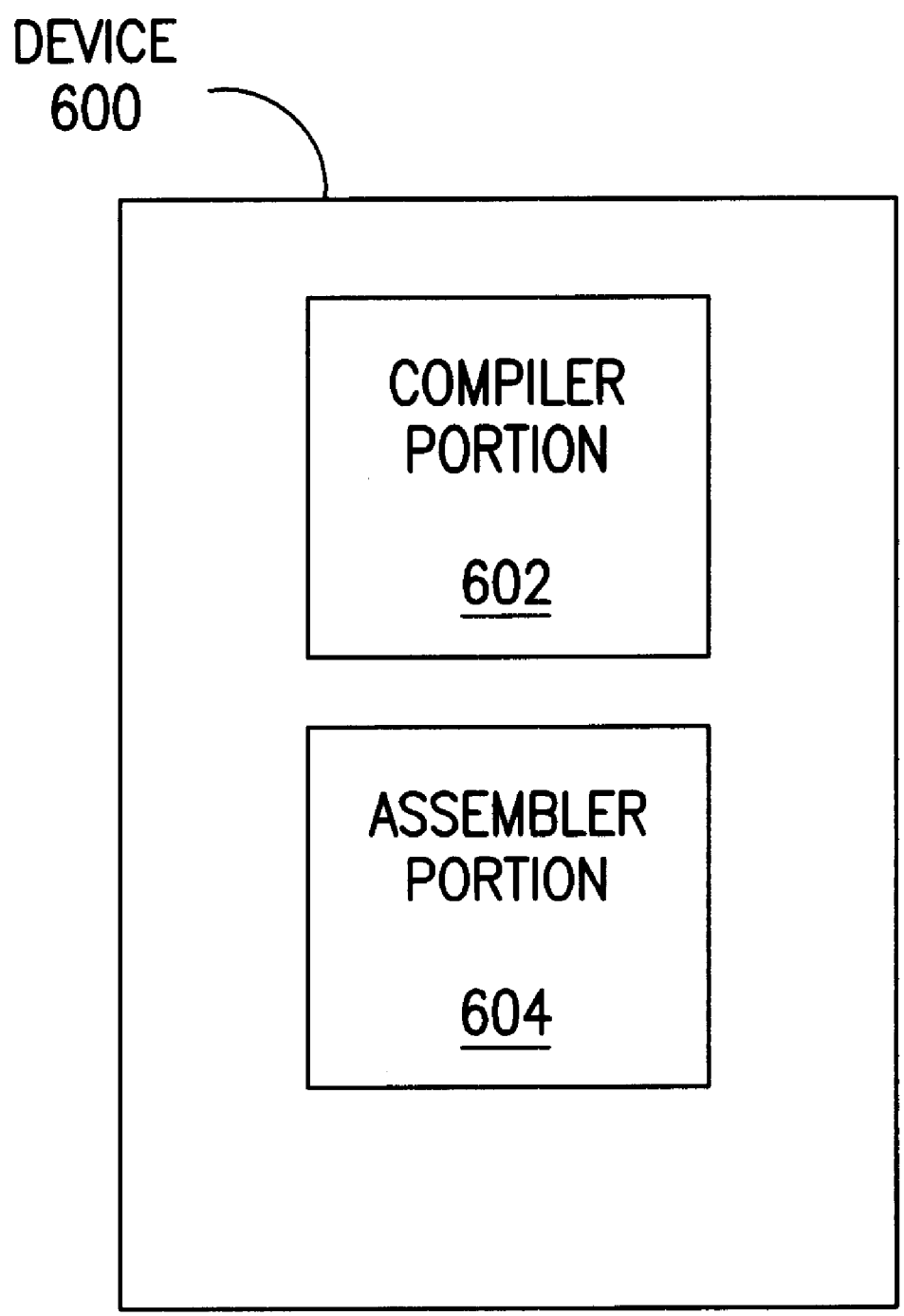
FIG. 6 is a block diagram illustrating a device on which one embodiment of the present invention can be implemented.

FIG. 6 is a block diagram illustrating a device on which one embodiment of the present invention can be implemented. The device 600 is meant to represent a wide variety of devices in which the present invention can be implemented, including conventional storage media (such as a floppy disk, hard disk, or a random access memory), as well as discrete hardware or firmware. The device 600 includes a compiler portion 602 and an assembler portion 604. Compiler portion 602 includes the instructions, to be executed by a processor, for carrying out the process of compiling a high-level language into assembly code, whereas assembler portion 604 includes the instructions, to be executed by a processor, for carrying out the process of converting the assembly code into object code.

According to an alternate embodiment, referred to as "automatic CPU dispatch", the compiler automatically and dynamically analyzes the source code and customizes the object code for particular processor types. In this embodiment, the compiler analyzes the source code on a code segment by code segment basis to determine whether a performance advantage can be obtained over the non-customized version of the function by customizing the function to a particular processor type. If greater than a threshold performance advantage can be obtained, then the compiler compiles the source code customized for particular processor types in addition to compiling the source code for a "generic" processor. Otherwise, only a "generic", non-processor-specific compilation is performed.

This alternate embodiment will now be described with reference to FIGS. 7 through 13.

Figure 7:
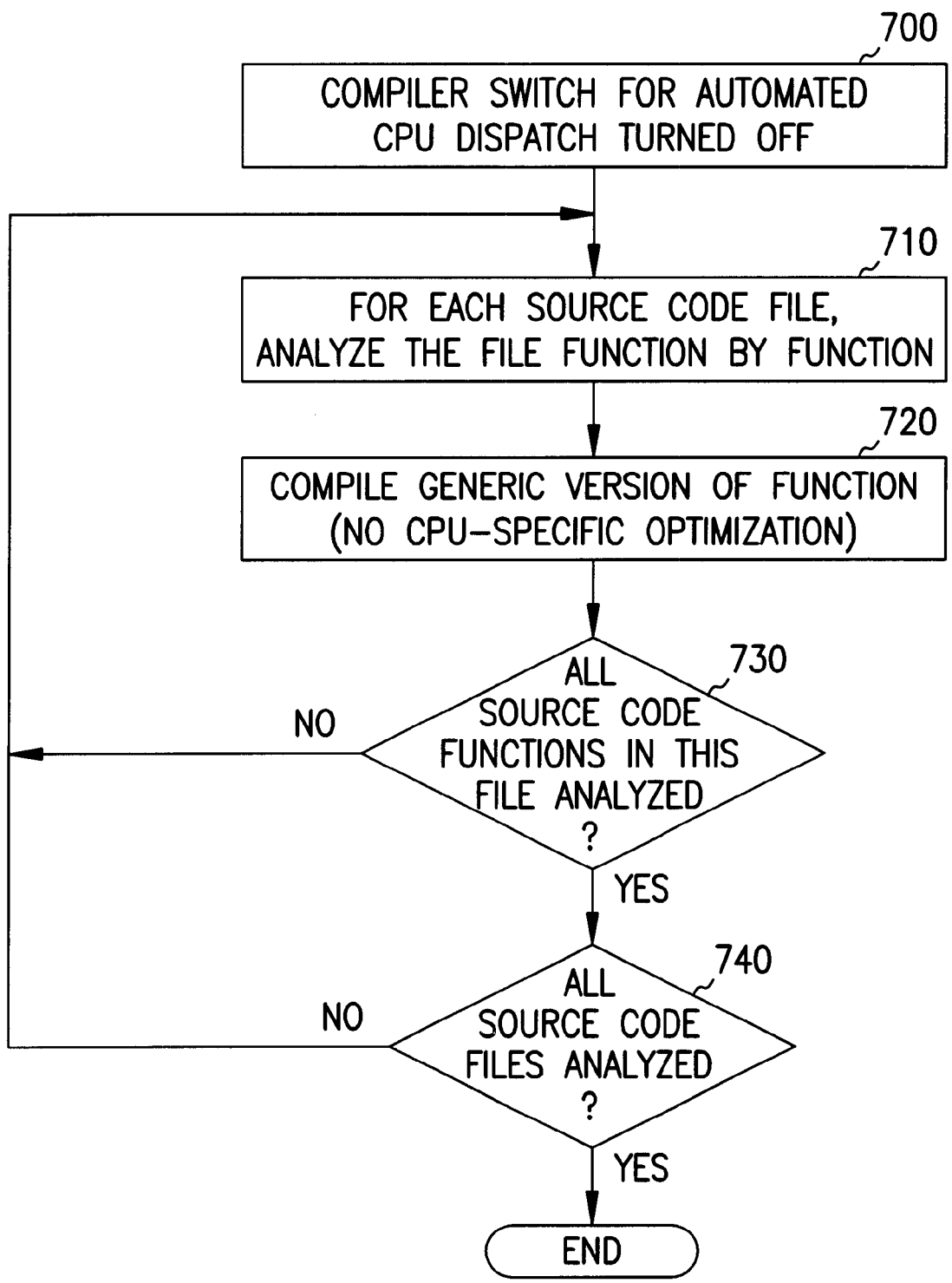
FIG. 7 is a flowchart illustrating the steps followed in compiling high-level language when a compiler switch for automatic CPU dispatch is turned off, according to an alternate embodiment of the invention.

FIG. 7 is a flowchart illustrating the steps followed in compiling high-level language when a compiler switch for automatic CPU dispatch is turned off, according to an alternate embodiment of the invention. The automatic CPU dispatch embodiment is implemented by a compiler that analyzes source code written for any of a set of N potential CPU types and, depending upon whether a particular compiler switch is set or turned off, either looks for opportunities to optimize the compiled code to any or all of the set of N potential CPU types, or simply compiles in the normal way, generating generic compiled code that will execute on each CPU of the set of N CPU types.

If the compiler switch is turned off, as shown in block 700 of FIG. 7, the compiler analyzes each source code file function-by-function (block 710), compiling a generic version of each function (block 720) with no CPU-specific optimization. When all functions in the particular source code file have been analyzed (block 730), the method returns to block 710 and analyzes another source code file, until all source code files have been analyzed (block 740), and the compiling method ends.

Figure 8:
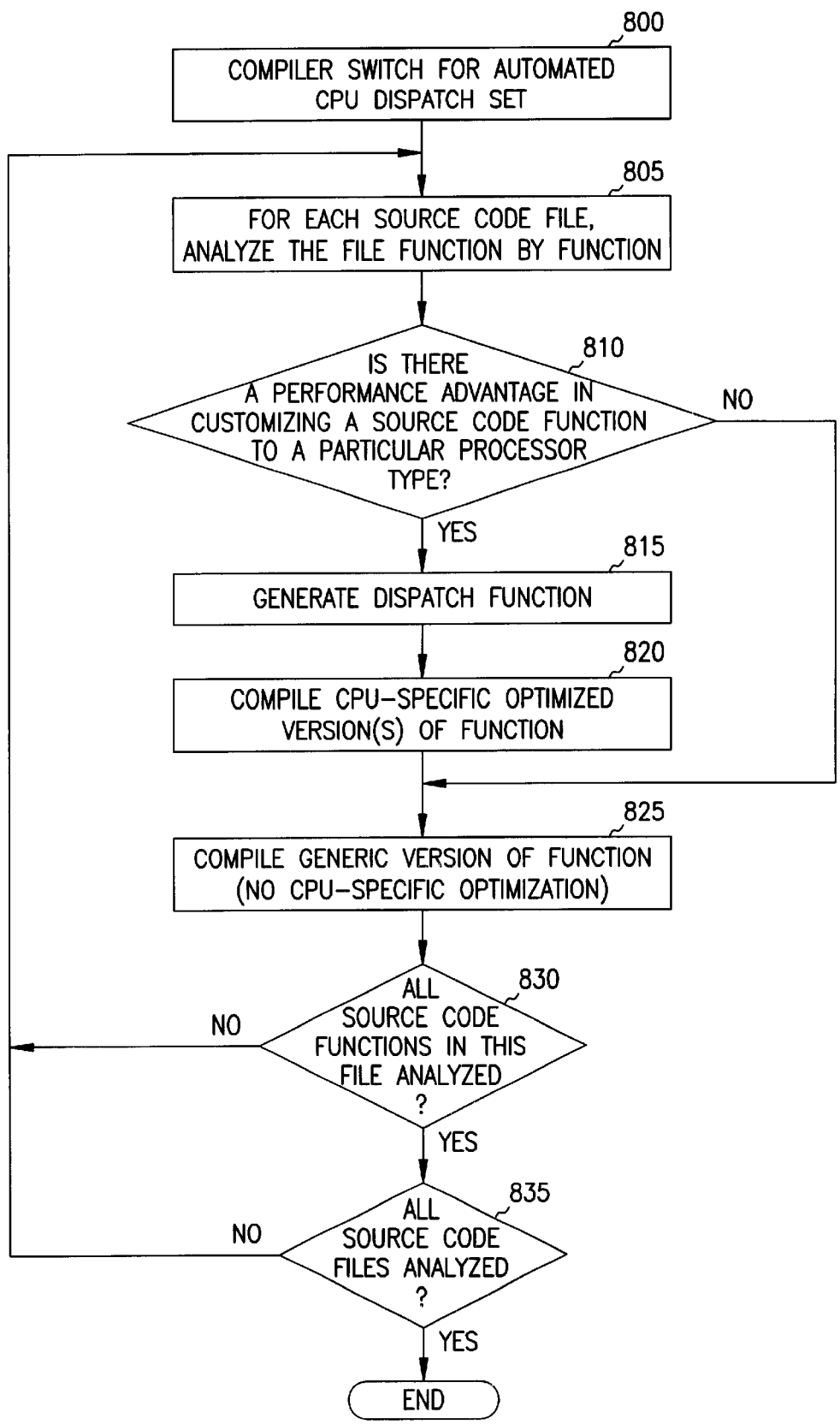
FIG. 8 is a flowchart illustrating the steps followed in compiling high-level language when a compiler switch for automatic CPU dispatch is set, according to an alternate embodiment of the invention.

FIG. 8 is a flowchart illustrating the steps followed in compiling high-level language when a compiler switch for automatic CPU dispatch is set, according to an alternate embodiment of the invention. If the compiler switch is set, as shown in block 800 of FIG. 8, the compiler analyzes each source code file function-by-function (block 805), and the compiler determines whether there is a performance advantage in customizing a particular source code function to a particular processor type (block 810).

If so, the method generates a dispatch function (block 815) that indicates which processor type(s) will execute one or more object code optimizations of the function. For example, if the compiler determines that the function could be performed faster by optimizing object code for the Pentium® III processor and Pentium® II processor than by merely compiling generic object code, the compiler will embed a construct in the compiled code indicating which processors types to test for and which specific compiled code to call for each of those processor types.

In block 820, the compiler compiles one or more CPU-specific optimized versions of the function, depending upon how many opportunities for optimization it determined in block 810. The method then proceeds to block 825.

If, in block 810, the compiler found no opportunities for customization, the method proceeds directly to block 825. In block 825, the compiler compiles a generic version of the function that will execute on any processor type in the set of N processor types. In the context of the CPU's described herein, this means that the compiled function can be executed by any CPU from a Pentium® processor to a Pentium® III processor.

When all functions in the particular source code file have been analyzed (block 830), the method returns to block 805 and analyzes another source code file, until all source code files have been analyzed (block 835), and the compiling method ends.

FIG. 9 illustrates sample source code segments that can be compiled by an automatic CPU dispatch construct according to an alternate embodiment of the invention. The sample source code segments in FIG. 9 comprise a plurality of source code files, i.e. File_A, File_B, File_C, through File_N, identified by 900, 930, 940, and 950 respectively. Each of files 900, 930, 940, and 950 can comprise one or more functions. For example, File_A (900) can comprise Function_A_1 (910), Function_FOO (915), and Function_A_M (920).

FIG. 10 illustrates sample assembly code for CPU-dispatch testing that is generated using automatic CPU dispatch according to an alternate embodiment of the invention. As in FIG. 4, the assembly code provides a series of tests for processor types. The tests are performed during execution by checking a value stored at the memory location identified by intel_cpu_indicator (i.e., the intel_cpu_ indicator variable). If the test succeeds, then the code jumps to the appropriate address for the beginning of the function for the identified processor type. However, if a test fails, then the code checks for another processor type.

The operation of the sample assembly code shown in FIG. 10 will be explained below with reference to FIGS. 11–13, each of which will first be briefly described FIG. 11 illustrates sample assembly code (1105, 1110) optimized for a high performance CPU that is generated using automatic CPU dispatch according to an alternate embodiment of the invention.

FIG. 12 illustrates sample assembly code (1205, 1210) optimized for a medium performance CPU that is generated using automatic CPU dispatch according to an alternate embodiment of the invention.

FIG. 13 illustrates sample assembly code (1305, 1310) with no CPU-specific optimizations that is generated using automatic CPU dispatch according to an alternate embodiment of the invention.

With reference once again to FIG. 10, the code initially checks with test 1000 to see whether the processor type is a Pentium® III processor. If the processor type is a Pentium® III processor, then the jump instruction 1005 transfers program execution to the memory location indicated by Function_FOO_$F (1100), which is the memory address of the section of assembly code for the Function_FOO function customized to the Pentium® III processor (function 915 of FIG. 9). The assembly code for Function_FOO_$F comprises code which has been specifically optimized for, and requires execution on, the Pentium® III processor and indicated generally for illustration purposes by 1105 and 1110. This assembly code can also be executed on future, higher performance processors, provided that they are backward-compatible with the Pentium® III processor, i.e. they can execute any code that the Pentium® III processor can execute.

If the processor type is not a Pentium® III processor, the code next checks with test 1010 to see whether the processor type is a Pentium® II processor. If the processor type is a Pentium® II processor, then the jump instruction 1015 transfers program execution to the memory location indicated by Function_Foo_$E (1200), which is the memory address of the section of assembly code for the Function_FOO function customized to the Pentium® II processor (function 915 of FIG. 9). The assembly code for Function_FOO_$E comprises code which has been specifically optimized for, and requires execution on, the Pentium® II processor and indicated generally for illustration purposes by 1205 and 1210. This optimized code can also be executed by CPU types, including future CPU types, which are more advanced than the Pentium® II processor, such as the Pentium® III processor, provided that they are backward-compatible with the Pentium® II processor.

The final test 1020 checks whether the processor type has already been determined. If so, then jump instruction 1025 jumps program execution to the memory location indicated by Function_FOO_$B (1300), which is the memory address of the section of assembly code for the non-customized or generic version of Function_FOO, indicated generally for illustration purposes by 1305 and 1310. This generic code can also be executed by all CPU types, including future CPU types, provided that they are backward-compatible.

If the processor type is not yet set in the intel_cpu_indicator variable, then a call 1030 to the intel_cpu_indicator initialization function located at the address intel_cpu_indicator_init is made. Upon return from the intel cpu_indicator initialization function, the program execution continues in a jump to test instruction 1000, thereby repeating the process. However, now that the intel_cpu_indicator variable has been initialized, one of the tests for processor type will be successful, and the appropriate version of the object code will be executed, depending upon the processor type.

As mentioned earlier, the compiler orders the test instructions so that the program execution jumps to the most "advanced" function (that is, the function customized to the most advanced processor architecture) which can be executed by the processor executing the program. Also in the illustrated embodiment, the compiler orders the test instructions in the assembly code such that the highest performance processor is tested for first. This reduces the overhead (the additional tests) of the present invention for higher performance processors. However, alternate embodiments can use different orderings. In one such alternate embodiment, the test instructions are ordered so that the most likely processor to be executing the program is tested for first.

The present invention can be implemented by a computer-readable medium containing instructions for instructing a processor. The instructions can include analyzing a source code segment, and determining whether generating a customized version of object code for the source code segment to execute on one of several types of processors would provide a performance advantage over generating a non-customized version of object code. If so, the customized version of object code is generated; otherwise, the non-customized version of object code is generated. The computer-readable medium further includes computer instructions that generate a control section that causes one of the versions of object code to be called during execution in accordance with an executing processor's type.

The computer-readable medium can also include instructions that determine whether generating two or more customized versions of object code to execute on two or more types of processors would provide performance advantages over a non-customized version of object code. If so, the two or more customized versions of object code are generated; otherwise, the non-customized version of object code is generated.

A control section is generated that causes a first customized version of object code to be called during execution if the executing processor is a first type, and that causes a second customized version of object code to be called during execution if the executing processor is a second type. The control section causes a non-customized version of object code to be called during execution if the executing processor is neither the first or second type.

If the first customized version of object code is more advanced than the second customized version of object code, the control section causes the first customized version to be executed if the control section examines the processor type variable and it corresponds to a processor type that can execute either the first or second customized versions of object code.

It should be noted that, although specific syntax for the present invention is discussed above, alternate embodiments can use variations on this syntax. According to one such alternate embodiment, the empty_function_definition of the cpu_dispatch construct is not empty, rather, it contains the code the user wishes for the compiler to make processor-specific. The compiler generates a different piece of object code for each of the different processors, based on the code of the cpu_dispatch construct. Each of these different pieces of code is optimized by the compiler for the particular processor types (e.g., by setting of specific compiler switches).

Various examples of processor types are given in the discussions above. Although different Intel-architecture processors are discussed, the present invention may also be used to customize code different manufacturers or different processor types of another manufacturer.

Additionally, the present invention is discussed above with reference to the C or C++ programming language. In alternate embodiments, the processor-specific and dispatch constructs are provided in other programming languages, such as PASCAL, Fortran, Java, etc.

Furthermore, other modifications can be made by compiler 110 to further enhance the processor-specific customization of the present invention. In an alternate embodiment, one such customization is the setting and clearing of particular processor optimization switches. In this embodiment, when compiling the cpu_dispatch and cpu_specific constructs, additional switches or compiler options are set by the compiler which correspond to the processor type of the function being compiled (as identified by the cpu_specific construct). These additional switches and/or compiler options cause the compiler to further customize the source code generated for the particular processor type.

In addition, the invention can be implemented by any suitable processor or other type of computational circuit, such as but not limited to a microprocessor, a microcontroller, a complex instruction set computing (CISC) microprocessor, a reduced instruction set computing (RISC) microprocessor, a very long instruction word (VLW) microprocessor, a graphics processor, a digital signal processor, an application-specific integrated circuit (ASIC), or any other type of processor or processing circuit, or combination thereof.

Thus, the present invention supports multiple processor-specific code segments in a single executable. In one embodiment, the present invention allows a programmer to write multiple different code segments, each customized to a particular type of processor, yet each advantageously having the same identifier. During program execution, the proper customized code segment is advantageously selected based on the type of processor that is executing the program.

Additionally, in another embodiment, the present invention allows a programmer to write a single code segment and advantageously have that single code segment analyzed and customized to different object code versions, executable by different processor types, automatically by the compiler. Again, during program execution, the proper customized code segment is advantageously selected based on the type of processor that is executing the program. When a new processor type is released that has new and/or different instructions, source code programs do not have to be rewritten. Instead, a simple re-compilation is all that is necessary, assuming that a new compiler supports the desired instructions.

One significant advantage of the present invention is that it enables independent software vendors (ISVs) to take advantage of different high performance instructions available on different types of processors while simultaneously allowing them to generate applications that can be executed on several types of processors. ISVs are more likely to take advantage of new instructions, because their application code is readily portable.

Thus, a method and apparatus for supporting and/or generating multiple processor-specific code segments in a single executable have been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A computer-implemented method to be performed by a compiler comprising:

analyzing a source code segment which is to be customized to a plurality of different processor types;

determining whether generating customized sections of object code for the source code segment to execute on each of the plurality of different processor types, respectively, would provide a performance advantage over generating a non-customized version of object code; and if so, generating object code for the source code segment, including generating a plurality of sections for the source code segment, each of the plurality of sections being object code for the source code segment customized for one of the plurality of different processor types, and generating a control section that causes a selected one of the plurality of sections to be called during execution of the object code in accordance with an executing processor's processor type.

2. The computer-implemented method of claim 1, wherein the generating includes setting one or more compiler switches specific to a processor type during generation of a section of the plurality of sections for the processor type.

3. The computer-implemented method of claim 1, wherein the analyzing comprises identifying a plurality of functions each having a same function name and each being customized to a different one of the plurality of different processor types.

4. The computer-implemented method of claim 1, wherein the analyzing comprises identifying a source code segment associated with a dispatch construct.

5. The computer-implemented method of claim 4, further comprising identifying a plurality of additional source code segments associated with a plurality of processor-specific constructs corresponding to the dispatch construct.

6. The computer-implemented method of claim 1, wherein each of the plurality of different processor types is a different processor architecture.

7. A machine-readable medium having stored thereon a plurality of instructions, designed to be executed by a processor, for implementing a function for, analyzing a source code segment which is to be customized to a plurality of different processor types;

determining whether generating customized sections of object code for the source code segment to execute on each of the plurality of different processor types, respectively, would provide a performance advantage over generating a non-customized version of object code; and if so, generating object code for the source code segment, including generating a plurality of sections for the source code segment, each of the plurality of sections being object code for the source code segment customized for one of the plurality of different processor types, and generating a control section that causes a selected one of the plurality of sections to be called during execution of the object code in accordance with an executing processor's processor type.

8. The machine-readable medium of claim 7, wherein the plurality of instructions for implementing a function for generating includes a plurality of instructions for implementing a function for setting one or more compiler switches specific to a processor type during generation of a section of the plurality of sections for the processor type.

9. The machine-readable medium of claim 7, wherein the plurality of instructions for implementing a function for analyzing comprises a plurality of instructions for implementing a function for identifying a plurality of source code segments each having a same name and each being customized to a different one of the plurality of different processor types.

10. The machine-readable medium of claim 7, wherein the plurality of instructions for implementing a function for analyzing comprises a plurality of instructions for implementing a function for identifying a source code segment associated with a dispatch construct.

11. The machine-readable medium of claim 10, wherein the plurality of instructions for implementing a function for analyzing are further for implementing a function for identifying a plurality of additional source code segments associated with a plurality of processor-specific constructs corresponding to the dispatch construct.

12. A method comprising:
a compiler analyzing a source code segment;
the compiler determining whether generating a customized version of object code for the source code segment to execute on one of several types of processors would provide a performance advantage over generating a non-customized version of object code; and
if so, the compiler generating the customized version of object code;
otherwise, the compiler generating the non-customized version of object code.

13. The method recited in claim 12 and further comprising:
the compiler generating a control section that causes one of the versions of object code to be called during execution in accordance with an executing processor's type.

14. The method recited in claim 12 wherein in determining the compiler determines whether generating two or more customized versions of object code to execute on two or more types of processors would provide performance advantages over a non-customized version of object code; and
if so, the compiler generating the two or more customized versions of object code;
otherwise, the compiler generating the non-customized version of object code.

15. The method recited in claim 14 and further comprising:
the compiler generating a control section that causes a first customized version of object code to be called during execution if the executing processor is a first type, the control section causing a second customized version of object code to be called during execution if the executing processor is a second type, and the control section causing a non-customized version of object code to be called during execution if the executing processor is neither the first or second type.

16. The method recited in claim 15 wherein the non-customized version of object code can be executed by any of the several types of processors.

17. The method recited in claim 15 wherein the control section examines a processor type variable.

18. The method recited in claim 17 wherein the first customized version of the object code is more advanced than the second customized version of object code, and wherein the control section causes the first customized version of object code to be executed if the processor type variable corresponds to a processor type that can execute either the first or second customized versions of object code.

19. The method recited in claim 12 wherein the compiler always generates a non-customized version of object code for the source code segment.

20. The method recited in claim 19 wherein the non-customized version of object code can be executed by any of the several types of processors.

21. The method recited in claim 12 wherein each of the several types of processors is a different processor architecture.

22. A processor executing a compiler program comprising the operations of:
the compiler program analyzing a source code segment;
the compiler program determining whether generating a customized version of object code for the source code segment to execute on one of several types of processors would provide a performance advantage over generating a non-customized version of object code; and
if so, the compiler program generating the customized version of object code;
otherwise, the compiler program generating the non-customized version of object code.

23. The processor recited in claim 22 wherein the compiler program further comprises the operation of generating a control section that causes one of the versions of object code to be called during execution in accordance with an executing processor's type.

24. The processor recited in claim 22 wherein in the determining operation the compiler program determines whether generating two or more customized versions of object code to execute on two or more types of processors would provide performance advantages over a non-customized version of object code; and
if so, the compiler program generates the two or more customized versions of object code;
otherwise, the compiler program generates the non-customized version of object code.

25. The processor recited in claim 24 wherein the compiler program further comprises the operation of generating a control section that causes a first customized version of object code to be called during execution if the executing processor is a first type, the control section causing a second customized version of object code to be called during execution if the executing processor is a second type, and the control section causing a non-customized version of object code to be called during execution if the executing processor is neither the first or second type.

26. The processor recited in claim 25 wherein the non-customized version of object code can be executed by any of the several types of processors .

27. The processor recited in claim 25 wherein the control section examines a processor type variable.

28. The processor recited in claim 27 wherein the first customized version of the object code is more advanced than the second customized version of object code, and wherein the control section causes the first customized version of object code to be executed if the processor type variable corresponds to a processor type that can execute either the first or second customized versions of object code.

29. The processor recited in claim 22 wherein the compiler program always generates a non-customized version of object code for the source code segment.

30. The processor recited in claim 29 wherein the non-customized version of object code can be executed by any of the several types of processors.

31. The processor recited in claim 22 wherein each of the several types of processors is a different processor architecture.

32. A computer-readable medium containing computer instructions for instructing a processor, the instructions comprising:

analyzing a source code segment;

determining whether generating a customized version of object code for the source code segment to execute on one of several types of processors would provide a performance advantage over generating a non-customized version of object code; and if so, generating the customized version of object code;

otherwise, generating the non-customized version of object code.

33. The computer-readable medium recited in claim 32 wherein the computer instructions further comprise:

generating a control section that causes one of the versions of object code to be called during execution in accordance with an executing processor's type.

34. The computer-readable medium recited in claim 32 wherein in determining the computer instructions determine whether generating two or more customized versions of object code to execute on two or more types of processors would provide performance advantages over a non-customized version of object code; and if so, generating the two or more customized versions of object code;

otherwise, generating the non-customized version of object code.

35. The computer-readable medium recited in claim 34 wherein the computer instructions further comprise:

generating a control section that causes a first customized version of object code to be called during execution if the executing processor is a first type, the control section causing a second customized version of object code to be called during execution if the executing processor is a second type, and the control section causing a non-customized version of object code to be called during execution if the executing processor is neither the first or second type.

36. The computer-readable medium recited in claim 35 wherein the non-customized version of object code can be executed by any of the several types of processors.

37. The computer-readable medium recited in claim 35 wherein the control section examines a processor type variable.

38. The computer-readable medium recited in claim 37 wherein the first customized version of the object code is more advanced than the second customized version of object code, and wherein the control section causes the first customized version of object code to be executed if the processor type variable corresponds to a processor type that can execute either the first or second customized versions of object code.

39. The computer-readable medium recited in claim 32 wherein the computer instructions always generate a non-customized version of object code for the source code segment.

40. The computer-readable medium recited in claim 39 wherein the non-customized version of object code can be executed by any of the several types of processors.

41. The computer-readable medium recited in claim 32 wherein each of the several types of processors is a different processor architecture.

* * * * *

UNITED STATES PATENT AND TRADEMARK OFFICE
CERTIFICATE OF CORRECTION

PATENT NO. : 6,473,897 B1  Page 1 of 1
DATED : October 29, 2002
INVENTOR(S) : Zia Ansari, Kevin B. Smith and Seth Abraham It is certified that error appears in the above-identified patent and that said Letters Patent is hereby corrected as shown below:

Column 1,
Line 19, delete "Modem" and insert -- Modern --, therefor.

Column 6,
Line 20, delete "$cpu_{13}$ specific" and insert -- cpu_ specific --, therefor.

Signed and Sealed this

Twenty-fifth Day of February, 2003

JAMES E. ROGAN
*Director of the United States Patent and Trademark Office*